United States Patent
Krueger et al.

(10) Patent No.: US 8,135,344 B2
(45) Date of Patent: Mar. 13, 2012

(54) METHOD FOR USING BLUETOOTH MODULE TO PROCESS NON-BLUETOOTH SIGNALS

(75) Inventors: Scott Krueger, San Francisco, CA (US); John Tang, San Carlos, CA (US); Jesse Dorogusker, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 998 days.

(21) Appl. No.: 12/030,774

(22) Filed: Feb. 13, 2008

(65) Prior Publication Data

US 2009/0203316 A1    Aug. 13, 2009

(51) Int. Cl.
*H04B 7/00*    (2006.01)

(52) U.S. Cl. ............... 455/41.2; 455/557; 455/435.3; 455/552.1; 370/320; 370/338; 370/349; 370/401; 709/229; 709/250

(58) Field of Classification Search ............ 455/41.2, 455/556.1, 552.1, 557, 435.3, 556.2; 370/338, 370/349, 401, 465, 320; 709/229, 250
See application file for complete search history.

(56) References Cited

U.S. PATENT DOCUMENTS

| | | | |
|---|---|---|---|
| 6,452,910 B1 * | 9/2002 | Vij et al. ............ | 370/310 |
| 7,227,487 B1 * | 6/2007 | Midya et al. .......... | 341/152 |
| 7,310,541 B2 * | 12/2007 | Shostak ............ | 455/575.6 |
| 7,382,786 B2 * | 6/2008 | Chen et al. ........ | 370/401 |
| 7,430,400 B2 * | 9/2008 | Russo et al. ......... | 455/66.1 |
| 7,443,235 B2 * | 10/2008 | Mun et al. ........... | 330/10 |
| 7,457,319 B2 * | 11/2008 | Madapushi et al. ..... | 370/476 |
| 7,515,935 B2 * | 4/2009 | Ibrahim et al. ........ | 455/553.1 |
| 7,519,393 B2 * | 4/2009 | Bahl et al. ........... | 455/557 |
| 7,546,144 B2 * | 6/2009 | de Leon et al. ....... | 455/557 |
| 7,555,291 B2 * | 6/2009 | Wassingbo ........... | 455/414.1 |
| 7,558,894 B1 * | 7/2009 | Lydon et al. ......... | 710/105 |
| 7,568,050 B2 * | 7/2009 | Karaoguz et al. ...... | 709/250 |
| 7,620,404 B2 * | 11/2009 | Chesnais et al. ...... | 455/456.1 |
| 7,672,543 B2 * | 3/2010 | Hull et al. ........... | 382/305 |
| 7,706,836 B2 * | 4/2010 | Kim et al. ........... | 455/553.1 |
| 7,756,100 B2 * | 7/2010 | Lin et al. ........... | 370/347 |
| 2007/0109165 A1 | 5/2007 | Midya et al. | |
| 2007/0232358 A1 * | 10/2007 | Sherman ............. | 455/560 |
| 2008/0032738 A1 * | 2/2008 | Boyer et al. ......... | 455/556.1 |
| 2009/0176454 A1 * | 7/2009 | Chen et al. .......... | 455/63.1 |

FOREIGN PATENT DOCUMENTS

WO    WO 02/09363 A    1/2002

OTHER PUBLICATIONS

PCT International Search Report and Written Opinion of Apr. 29, 2009 for application No. PCT/US2009/033037.

* cited by examiner

*Primary Examiner* — Marceau Milord
(74) *Attorney, Agent, or Firm* — Kilpatrick Townsend & Stockton LLP

(57) ABSTRACT

An electronic device having a communications module with a first set of data rates can be enabled to use the communications module to process signals received from a source that uses a second set of data rates. The device may generate packets, frames, etc. at the first set of data rates using the communications module from the signals received from the remote source by sampling signals at one or more of the first set of data rates. The device may then reconstruct data or payloads originally transmitted in the signals at the second set of data rates from the packets generated at the first set of data rates. Thus, the device can process signals or transmissions at the second set of data rates using the first set of data rates without requiring additional receivers or communications modules to process the signals.

17 Claims, 11 Drawing Sheets

METHOD FOR USING BLUETOOTH MODULE TO PROCESS NON-BLUETOOTH SIGNALS

CROSS-REFERENCES TO RELATED APPLICATIONS

This application is related to co-pending U.S. patent application Ser. No. 12/030,754, filed on Feb. 13, 2008 and entitled "Momentary Burst Protocol for Wireless Transmission," the entire disclosure of which is herein incorporated by references for all purposes.

FIELD OF THE INVENTION

The present invention relates to communication protocols. More specifically, the present invention relates to techniques for using a communications module that processes data at a first data rate to process signals sent at a second data rate.

BACKGROUND OF THE INVENTION

Electronic devices, such as portable media players, cellular phones, personal digital assists (PDAs), and the like, are prevalent in today's marketplace, as are the peripheral electronic devices that support their use, such as docking stations and the like. As competition in the personal electronics marketplace becomes ever more heated, consumers have become more demanding in terms of both the functionality and use of such devices.

Often, increases in functionality also include the inclusion of additional circuitry to the device that provide the functionality. The additional circuitry adds to the size and expense of the device. Additionally, some circuitry may need to be included in a next generation device in order to provide backwards compatibility with previous functionality.

Accordingly, what is desired are improved methods and apparatus for providing some features of backwards compatibility without adding additional circuitry to a device. Additionally, what is desired are improved methods and apparatus for reducing some of the drawbacks discussed above.

BRIEF SUMMARY OF THE INVENTION

An electronic device having a communications module with a first set of data rates can be enabled to use the communications module to process signals received from a source that uses a second set of data rates. The device may generate packets, frames, etc. using the communications module from the signals received from the remote source by sampling the signals at one or more of the first set of data rates. The device may then reconstruct data or payloads originally transmitted in the signals at the second set of data rates from the packets generated at the first set of data rates. Thus, the device can process signals or transmissions at the second set of data rates using the first set of data rates without requiring additional receivers or communications modules to process the signals.

In various embodiments, a non-Bluetooth transmitter communicates data by generating a non-Bluetooth packet. The non-Bluetooth transmitter may transmit the non-Bluetooth packet at a particular data rate, for example, using a unicast, multicast, anycast, or broadcast transmission. A Bluetooth receiver, such as a portable media player or smart phone with Bluetooth circuitry, can receive the non-Bluetooth signals sent at the particular data rate using the Bluetooth circuitry. In one embodiment, the Bluetooth receiver can "over-sample" the signal or transmission of the non-Bluetooth packet sent at the particular data rate using one or more data rates associated with the Bluetooth circuitry.

In some embodiments, the Bluetooth receiver may generate a Bluetooth packet from the over-sampled information. The Bluetooth receiver may reconstruct the non-Bluetooth packet from the over-sampled information. The Bluetooth receiver may further interpret portions of the reconstructed non-Bluetooth packet according to the Bluetooth protocol, for example, to ensure proper security and addressing.

In still further embodiments, the electronic device may manage communications between signals at the first and second data rates. The device may prioritize communications (e.g., transmissions and/or receptions) in response to policies, timing plans, frequencies, or the like. In one embodiment, the device may manage communications that may occur on a determined frequency, such that interference and overlap may be reduced.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

In order to better understand the present invention, aspects of the environment within which various embodiments operate will first be described.

Figure 1:
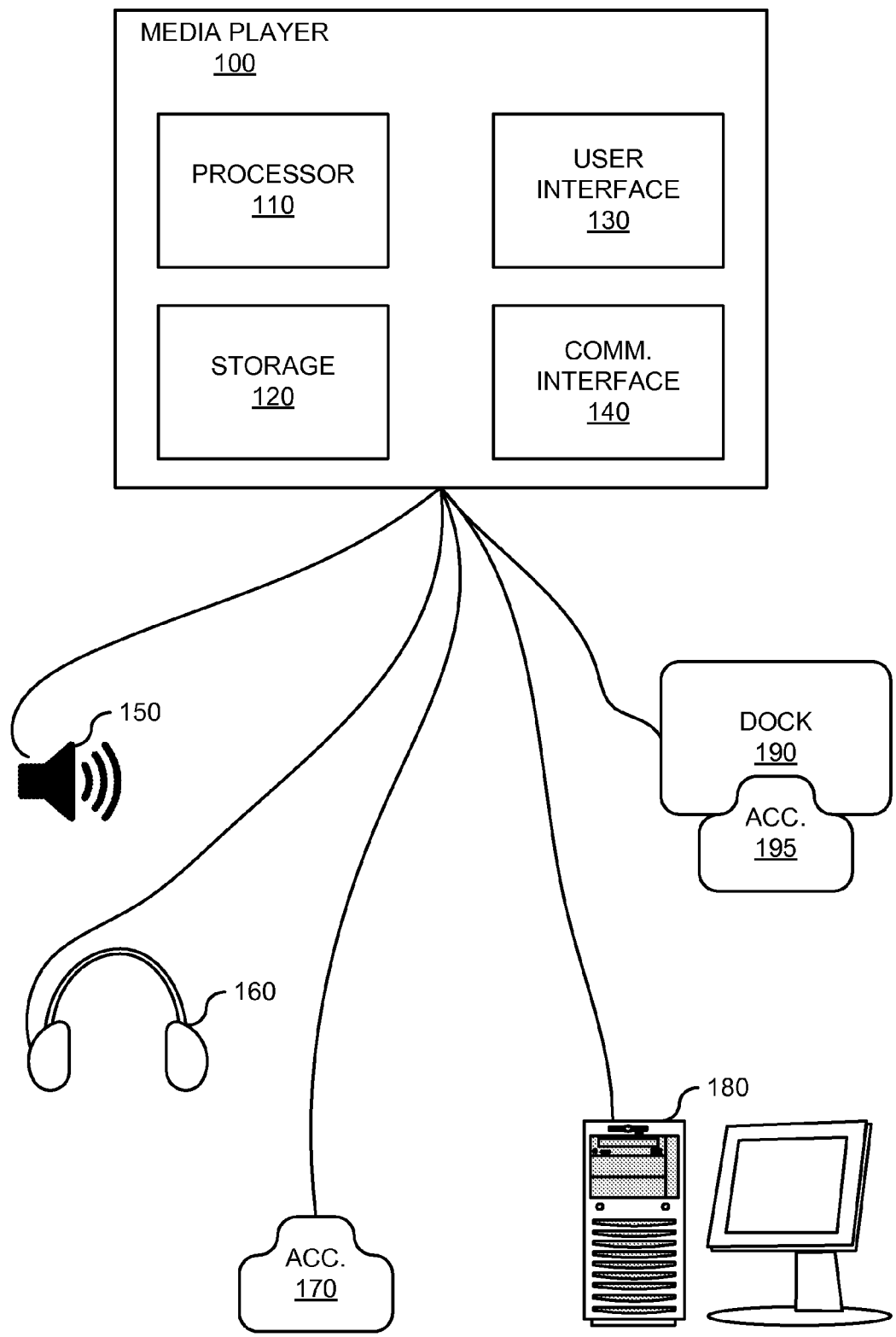
FIG. 1 is a block diagram of a media player that may incorporate embodiments of the present invention.

FIG. 1 is a block diagram of media player 100 that may incorporate embodiments of the present invention. In general, a media player stores content and/or media assets, such as audio tracks, movies, or photos that can be played or displayed on the media player. One example of media player 100 can be the iPod® media player, which is available from Apple, Inc. of Cupertino, Calif. Another example of media player 100 can be a personal computer, such as a laptop or desktop.

In this example, media player 100 includes processor 110, storage 120, user interface 130, and communications interface 140. In general, processor 110 controls various functionalities associated with media player 110. Media play 100 may output audio content, video content, image content, and the like. Media player 100 may further output information associated with content, such as track information and album art.

Typically, a user may load or store content using storage 120. Storage 120 may be any read-only memory (ROM), random access memory (RAM), non-volatile memory, flash memory, floppy disk, hard disk, and the like. A user may interact with user interface 130 of media player 100 to view or consume content. Some examples of user interface 130 are buttons, click wheels, touch pads, displays, touch screens, and other input/output devices.

Media player 100 typically includes one or more connectors or ports that can be used to load content, retrieve content, interact with applications running on media player 100, interface with external devices, and the like. In this example, media player 100 includes communications interface 140. Some examples of communications interface 140 include universal serial bus (USB) interfaces, IEEE 1394 (or FireWire/iLink®) interfaces, universal asynchronous receiver/transmitters (UARTs), wired and wireless network interfaces, transceivers, and the like. Media player 100 may connect to devices, accessories, private and public communications networks, such as the Internet and the like using communications interface 140.

In one example, a connector or port may enable media player 100 to output audio to a pair of speakers 150. In another example, a connector or port may enable media player to output audio to a pair of headphones 160. In yet another example, a connector or port may enable media player 100 to interface with an accessory 170, a host computer 180, or be inserted into a docking system 190.

Docking system 190 may further enable one or more accessory devices 195 to interface with media player 100. There are today many different types of accessory devices 170 and 195 that can interconnect to media player 100. For example, an accessory may allow a remote control to wirelessly control media player 100. As another example, an automobile may include a connector into which media player 100 may be inserted such that an automobile media system can interact with media player 100, thereby allowing media content stored on media player 100 to be played within the automobile.

Often, media player 100 receives content or other media assets from a computer system (e.g., host computer 160) that serves to enable a user to manage media assets. As an example, communications interface 140 allows media player 100 to interface with host computer 160. Host computer 160 executes a media management application to manage media assets, such as loading songs, movies, photos, and the like onto media player 100 and creating playlists. One example of a media management application can be iTunes®, produced by Apple, Inc. of Cupertino, Calif.

In various embodiments, media player 100 includes a communications module with a first set of data rates can be enabled to use the communications module to process signals received from a source that uses a second set of data rates. Media player 100 may generate packets, frames, etc. using the communications module from the signals received from the remote source by sampling the signals at one or more of the first set of data rates. Media player 100 may then reconstruct data or payloads originally transmitted in the signals at the second set of data rates from the packets generated at the first set of data rates.

Figure 2A:
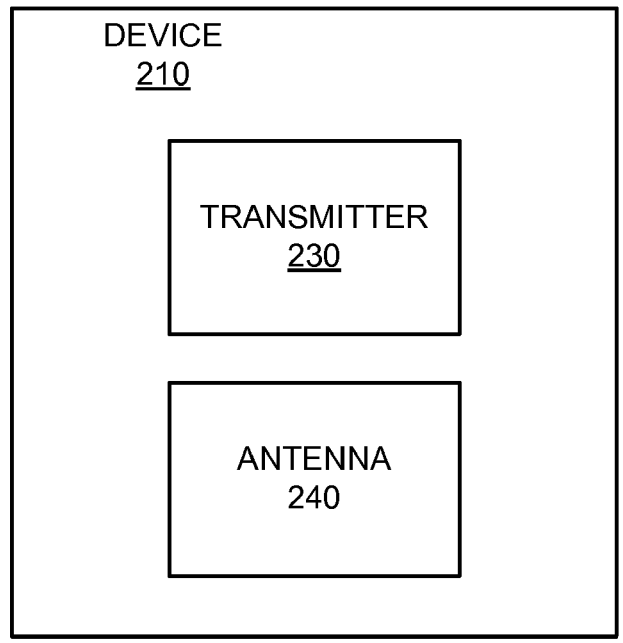
FIGS. 2A and 2B are block diagrams of a transmitting device and a receiving device in one embodiment according to the present invention.
Figure 2B:
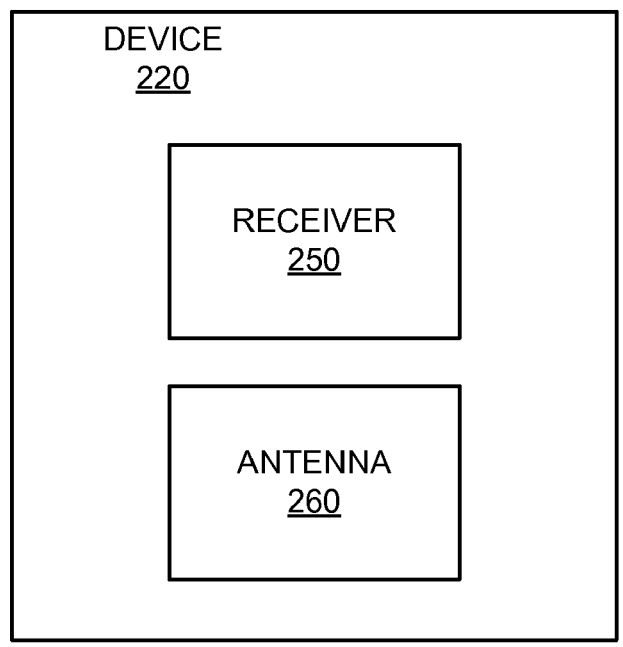

FIGS. 2A and 2B are block diagram of transmitting device 210 and receiving device 220 in one embodiment according to the present invention. In various embodiments, media player 100 can be transmitting device 210 and configured to transmit data. Media player 100 may also be receiving device 220, and configured to receive data.

In this example, transmitting device 210 includes transmitter 230 and antenna 240. Transmitter 230 can be any hardware and/or software elements configured to transmit data. Transmitter 230 may include a radio configured to transmit data wirelessly via antenna 240 using a number of formats or protocols. Transmitter 230 may communicate data using one or more predetermined data rates. Some examples of protocols may be IEEE 802.11 or WiFi, IEEE 802.15 or Bluetooth, IEEE 802.16 or WiMAX, CDMA, GSM, or other wired and wireless protocols. Some examples of transmitting device 210 may be media player 100 acting as a transmitter, a wireless remote control, a remote sensor, a wireless accessory, or the like.

Receiving device 220 includes receiver 250 and antenna 260. Receiver 250 can be any hardware and/or software elements configured to receive data. Receiver 250 may include a radio configured to receive data wirelessly via antenna 260 using a number of formats or protocols, such as those discussed above. Receiving device 220 may communicate data using one or more predetermined data rates. Some examples of receiving device 250 may be media player 100 acting as a receiver, a wireless accessory, and the like.

In various embodiments, receiving device 220 may process signals normally at a first set of data rates. Receiving device 220 may further process signals received from a source that uses a second set of data rates. Receiving device 220 may generate packets, frames, etc. from the signals at the second set of data rates received from the source by sampling the signals as if received using the first set of data rates. Receiving device 220 may then reconstruct data or payloads originally transmitted in the signals at the second set of data rates from the packets generated at the first set of data rates. For example, receiving device 220 may be configured to process non-Bluetooth signals received from a remote source (e.g., transmitting device 210 embodied as a remote sensor, transponder, etc.) using a Bluetooth module.

Figure 3:
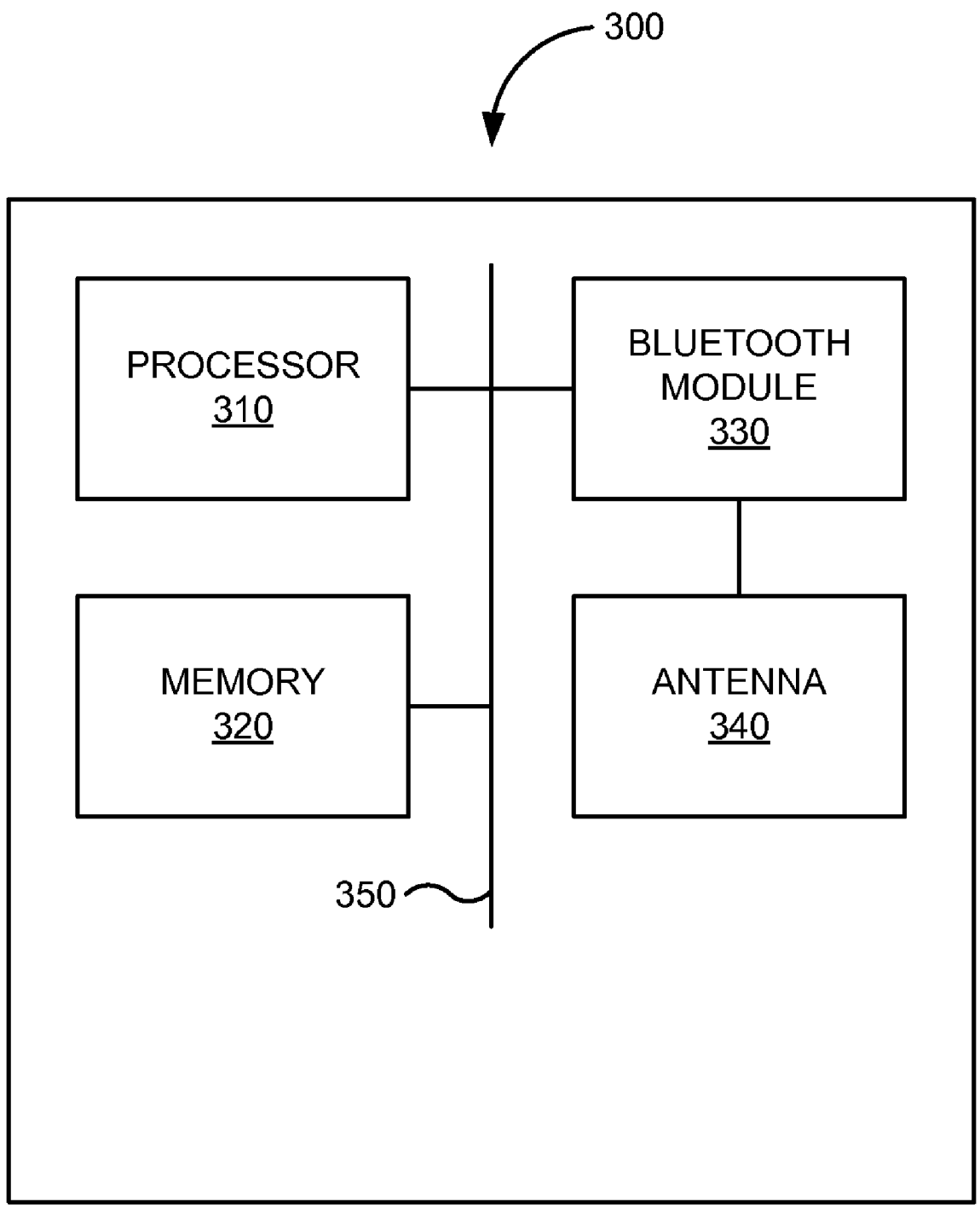
FIG. 3 is a block diagram of a Bluetooth device in one embodiment according to the present invention.

FIG. 3 is a block diagram of Bluetooth device 300 in one embodiment according to the present invention. Bluetooth device 300 includes processor 310, memory 320, Bluetooth module 330, antenna 340, and bus 350. Processor 310, memory 320, and Bluetooth module 330 are link via bus 350. Bluetooth module 330 is linked to antenna 340.

Bluetooth module 330 can be any hardware and/or software elements configured to communicate data (e.g., transmit and/or receive) using one or more of wired and/or wireless protocols. One example of Bluetooth module 330 is described further with respect to FIG. 4.

Figure 4:
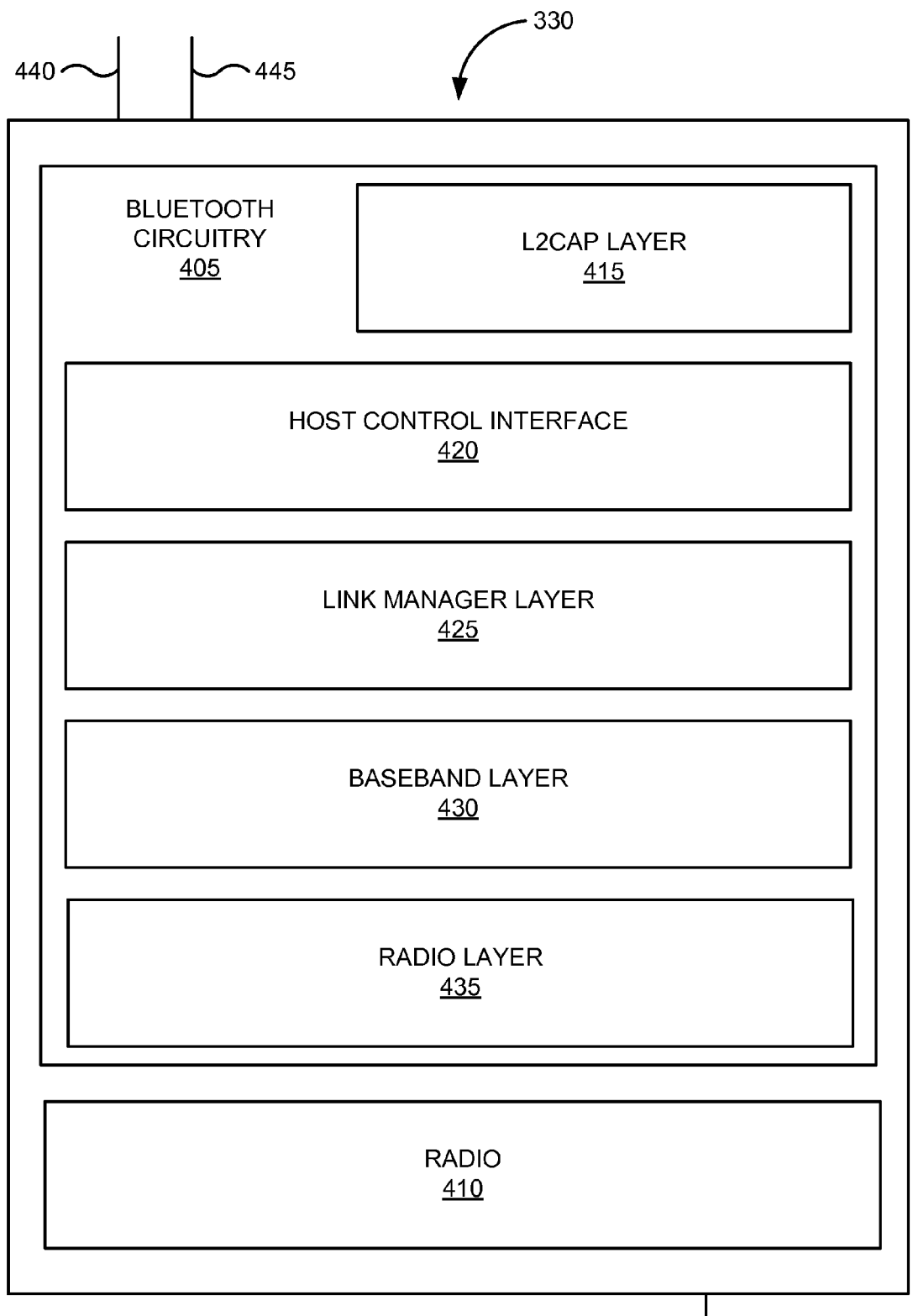
FIG. 4 is a block diagram of a Bluetooth module in one embodiment according to the present invention.

FIG. 4 is a block diagram of Bluetooth module 330 in one embodiment according to the present invention. Bluetooth module 330 includes Bluetooth circuitry 405 and radio 410. Bluetooth circuitry 405 can be any hardware and/or software elements for communicating data. Bluetooth circuitry 405 may communicate data using one or more first data rates.

In various embodiments, Bluetooth circuitry 405 may use the one or more first data rates to process data sent from a transmitter using or more second data rates. For example, Bluetooth circuitry 405 may primarily communicate data using the Bluetooth protocol, and secondarily process data from one or more non-Bluetooth protocols.

In this example, Bluetooth circuitry 405 includes Logical Link Control and Adaptation Protocol (L2CAP) layer 415, Host Control Interface (HCI) 420, Link Manager layer 425, Baseband layer 430, and Radio layer 435. L2CAP layer 415 can be any hardware and/or software elements configured to provide connection-oriented and connectionless data services. L2CAP layer 415 may further provide protocol multiplexing capabilities, segmentation and reassembly operations, and group abstractions. In various embodiments, two link types are supported: Synchronous Connection-Oriented (SCO) links (e.g., which support real-time voice traffic using reserved bandwidth) and Asynchronous Connection-Less (ACL) links (e.g., which support best effort traffic).

HCI 420 can be any hardware and/or software elements configured to provide one or more command interfaces to Link Manager layer 425 and Baseband layer 430. HCI layer 420 may provide access to hardware status and control registers associated with Bluetooth circuitry 405. In various embodiments, HCI 420 may provide a uniform method of accessing Bluetooth and non-Bluetooth baseband capabilities, such as processing non-Bluetooth signals, managing Bluetooth and non-Bluetooth communications, or the like.

Link Manager layer 425 can be any hardware and/or software elements configured to provide link management. Link Manager layer 425 may provide link setup, authentication, link configuration, and other protocols. In some embodiments, Link Manager layer 425 may discover other remote link managers and communicate with them via the Link Manager Protocol (LMP). In general, the Link Manager Protocol essentially consists of a number of protocol Data Units (PDUs), which are sent from one device to another.

Baseband layer 430 can be any hardware and/or software elements configured to provide management of physical channels and links. Baseband layer 430 may include a Link Controller, which works with Link Manager layer 425 for carrying out link level routines, such as link connection and power control. In various embodiments, Baseband layer 430 may manage asynchronous and synchronous links, handle packets, and perform paging and inquiry to access and inquire Bluetooth devices in the area. Baseband layer 430 may include a baseband transceiver that applies a time-division duplex (TDD) scheme (alternate transmit and receive), thus, time may be also slotted apart from different hopping frequency (frequency division).

Radio layer 435 can be any hardware and/or software configured to provide the requirements of a Bluetooth transceiver device using one or more predetermined frequencies, such as operating in the 2.4 GHz ISM band.

In one example of operation, Bluetooth module 330 can receive control signals using control lines 445 to operate one or more functionalities associated with Bluetooth circuitry 405 and radio 410. Bluetooth module 330 can receive or provide data using data lines 445. Bluetooth module 330 may be linked to antenna 340 via line 450 through which radio 410 transmits and/or receives signals.

Returning again to FIG. 3, in various embodiments, Bluetooth module 330 may be configured to process packets, signals, frames, or the like using the Bluetooth protocol for wireless personal area networks (PANs). Additionally, Bluetooth module 330 may process one or more types of non-Bluetooth signals. Thus, Bluetooth device 300 may process Bluetooth signals as well as non-Bluetooth signals. Bluetooth module 300 may be programmed to simultaneously handle both Bluetooth and non-Bluetooth communications. In one example, a transponder may transmit data using a non-Bluetooth protocol. Bluetooth module 330 may receive or "sample" (e.g., using hardware, software, firmware, or combinations thereof) the non-Bluetooth signals transmitted by the radio.

In some embodiments, Bluetooth module 330 may process data at one or more data rates associated with the Bluetooth protocol. Bluetooth module 330 may "over-sample" non-Bluetooth signals using a data rate of the Bluetooth protocol (e.g., 1 Mbps) that is different from the data rate of the non-Bluetooth protocol (e.g., 250 kbps) with which the data was sent. In one example, Bluetooth module 330 samples the non-Bluetooth signals at a data rate that is an order of a magnitude greater that the data rate with which the non-Bluetooth signals were sent.

In response to sampling the non-Bluetooth signals, Bluetooth module 330 then may reconstruct the originally transmitted data. For example, one or more Bluetooth packets may be generated using the above over-sampling. Bluetooth module 330 may reconstruct any data or payloads carried in the original non-Bluetooth signals from the newly generated Bluetooth packets. Bluetooth module 330 may interpret portions of the Bluetooth packets (or the reconstructed non-Bluetooth packets) according to the Bluetooth protocol, for example, to provide error correction, ensure device security, addressing, or the like.

In still further embodiments, Bluetooth module 330 may manage communications between Bluetooth and non-Bluetooth signals. Bluetooth module 330 may prioritize transmissions and/or scheduled receptions in response to timing plans associated with non-Bluetooth signals from remote sources. In one embodiment, Bluetooth module 330 may determine a frequency associated with transmission of non-Bluetooth signals. Bluetooth module 330 then may manage scheduling and/or prioritization of communications (e.g., both Bluetooth and non-Bluetooth) associated with the determined frequency, such that interference, conflicts, and overlap may be reduced.

Accordingly, Bluetooth device 300 may not need to include any receivers in addition to Bluetooth module 330 to process both Bluetooth and non-Bluetooth signals.

Figure 5:
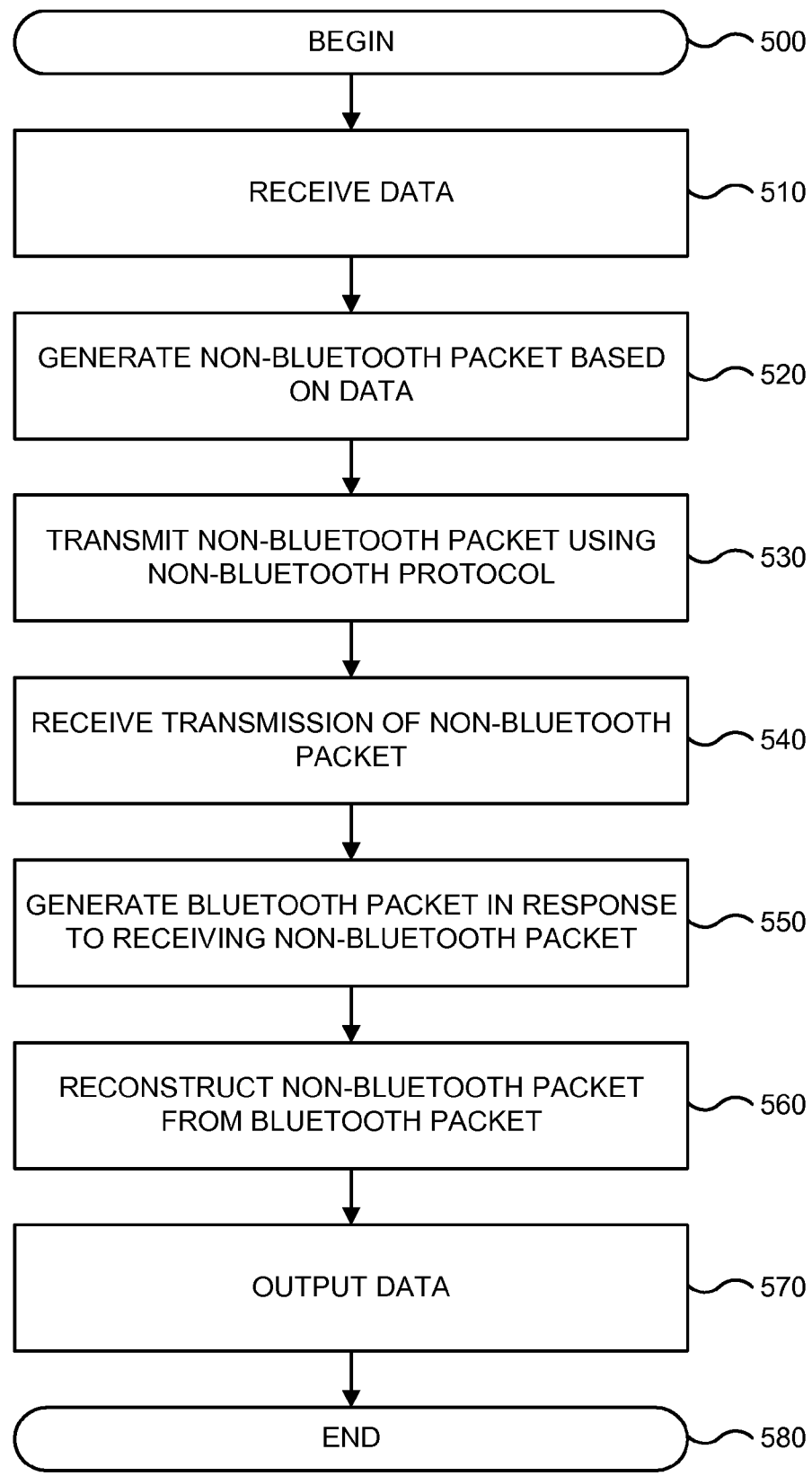
FIG. 5 is a flowchart of a method for processing non-Bluetooth packets in one embodiment according to the present invention.

FIG. 5 is a flowchart of a method for processing data transmitted using a first protocol in one embodiment according to the present invention. The processing depicted in FIG. 5 may be performed by software modules (e.g., instructions or code) executed by a processor of a computer system, by hardware modules of the computer system, or combinations thereof. FIG. 5 begins in step 500.

In step 510, data is received. For example, a remote source may collect data and send data to a transmitter to be transmitted to a remote destination. In step 520, a non-Bluetooth packet is generated based on the data. Non-Bluetooth packets can be any transmissions, signals, frames, packets or the like, that do not use the Bluetooth protocol to transmit data.

In step 530, the non-Bluetooth packet is transmitted using a non-Bluetooth protocol. For example, the data may be included is a payload of a sensor packet. The sensor packet then may be transmitted according to any number of non-Bluetooth protocols. In another example, the data may be transmitted at a different data rate than the Bluetooth protocol.

In step 540, transmission of the non-Bluetooth packet is received. In one embodiment, a transmission of the non-Bluetooth packet is sampled by a Bluetooth module (e.g., Bluetooth module 330). For example, Bluetooth module 330 receives the transmission of the non-Bluetooth packet using a first data rate (e.g., 1 Mbps) associated with the Bluetooth protocol. If the transmission of the non-Bluetooth packet occurs at a second data rate that is different from (e.g., lower than) the first data rate associated with the Bluetooth protocol, Bluetooth module 330 may "over-sample" the transmission of the non-Bluetooth packet. In general, over-sampling using the data rate associated with the Bluetooth protocol provides a plurality of data elements (or samples) at the Bluetooth data rate for each individual data element of the transmission of the non-Bluetooth packet at the non-Bluetooth data rate.

In step 550, a Bluetooth packet is generated in response to receiving the non-Bluetooth packet. For example, Bluetooth module 330 may generate the Bluetooth packet from the plurality of data elements received at the Bluetooth data rate representing the individual data elements of the non-Bluetooth signal. In step 560, the non-Bluetooth packet is reconstructed from the Bluetooth packet. In one example, Bluetooth module 330 includes hardware, software, and/or firmware that interprets, filters, or the like the Bluetooth packet into the non-Bluetooth packet. Bluetooth module 330 may generate a replica of the non-Bluetooth packet or reformat the Bluetooth packet to include reconstructed portions (e.g., headers, addresses, payloads, etc.) of the non-Bluetooth packet.

In step 570, the data is output. In some embodiments, Bluetooth module 330 outputs the payload of the reconstructed non-Bluetooth packet. In further embodiments, Bluetooth module 330 outputs a Bluetooth packet that includes reconstructed portions of the non-Bluetooth packet. FIG. 5 ends in step 580.

Figure 6:
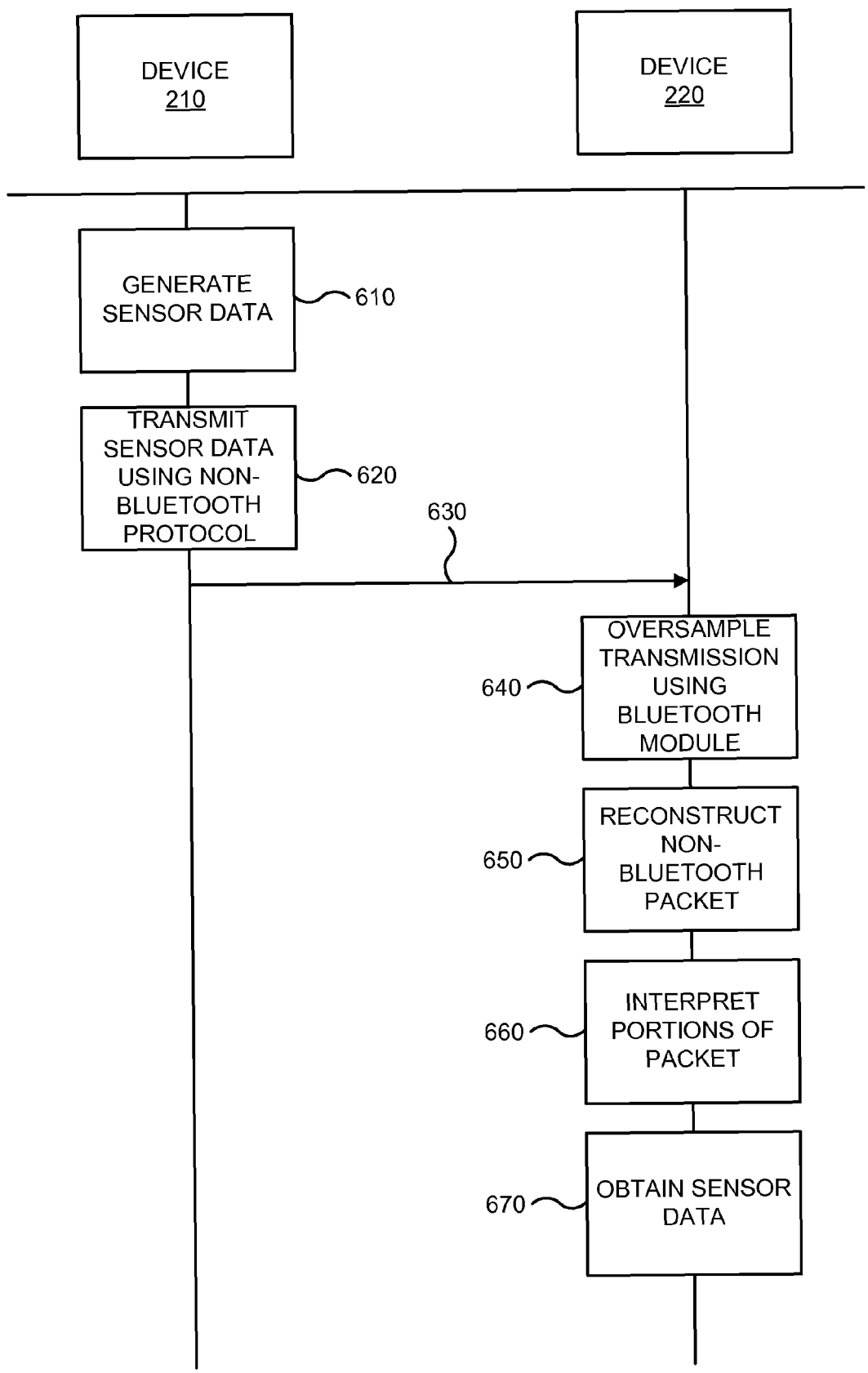
FIG. 6 is a message sequence chart illustrating processing non-Bluetooth packets using a Bluetooth module in one embodiment according to the present invention.

FIG. 6 is a message sequence chart illustrating processing non-Bluetooth packets using a Bluetooth module (e.g., Bluetooth module 330) in one embodiment according to the present invention. In this example, device 210 generates sensor data in step 610. In step 620, device 210 transmits the sensor data in packet 630 using the non-Bluetooth protocol. In order to transmit the data in packet 630, device 210 may generate the non-Bluetooth packet and insert the data into a payload of the non-Bluetooth packet.

Figure 7:
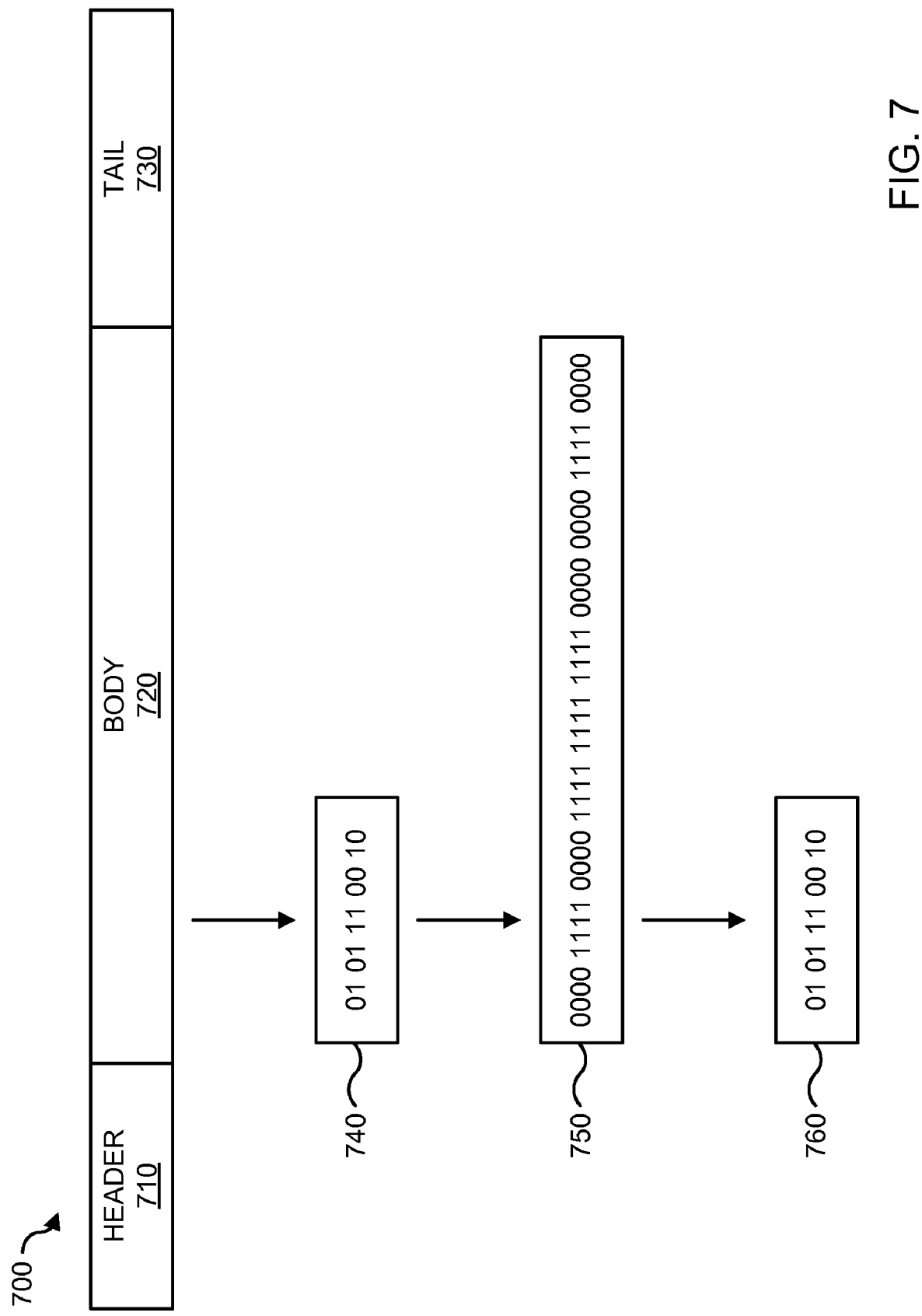
FIG. 7 is a block diagram illustrating over-sampling and reconstructing of data in one embodiment according to the present invention.

Referring to FIG. 7, packet 700 typically includes header 710, body 720, and tail 730. Header 710, body 720, and tail 730 may include information, addresses, attributes, flags, and the like that define or indicate one or more features of the non-Bluetooth protocol. Body 720 generally includes data to be transmitted. The non-Bluetooth protocol may transmit packet 700 using a 250 kbps data rate.

Returning to FIG. 6, in step 640, device 220 over-samples transmission of packet 630 using a Bluetooth module. Device 220 may generate a Bluetooth packet in response to receiving transmission of packet 630 that includes the over-sampled information. For example, data 740 of FIG. 7 includes a sequence of bits (e.g., 01 0111 00 10) in body 730 of packet 700. Since a Bluetooth module typically processes data at 1 Mbps or faster, the Bluetooth module over-samples transmission of packet 630 to generate data 750 in FIG. 7. In this example, data 750 includes a sequence of bits (e.g., 0000 1111 0000 1111 1111 1111 0000 0000 1111 0000) representing the information in packet 630 over-sampled at approximately a four to one ratio (1 Mbps/250 kbps) to that of data 740.

Thus, if device 210 transmits the value of one at 250 kbps, device 220 using a Bluetooth module processing data at 1 Mbps would "see" the value of one transmitted by device 210 as four values of one according to the Bluetooth protocol. Therefore, device 220 generates a Bluetooth packet that in fact includes four times as many bits as packet 630. In various embodiments, device 220 may take advantage of this over-sampling for the purposes of error correction.

In step 650, device 220 reconstructs packet 630. For example, device 220 may apply one or more rules and/or filters to reconstruct packet 630 from the over-sampled information to obtain data 760 of FIG. 7.

In step 660, device 220 interprets portions of packet 630. For example, portions of packet 630 may be interpreted as a Bluetooth source address, destination address, attribute, checksum, and the like. Typically, Bluetooth radios are constructed to be programmed to lock onto a very particular bit sequence (or access code) at the beginning of a transmission. Transmissions not having a particular bit sequence may be discarded by the Bluetooth radio. In various embodiments, portions of packet 630 may be interpreted as a Bluetooth access code, allowing the non-Bluetooth transmitter to transmit data that will be accepted by the Bluetooth radio.

In step 670, device 220 obtains the sensor data. Device 220 may retrieve the sensor data from the body portion of packet 630. FIG. 6 ends in step 670.

Figure 8:
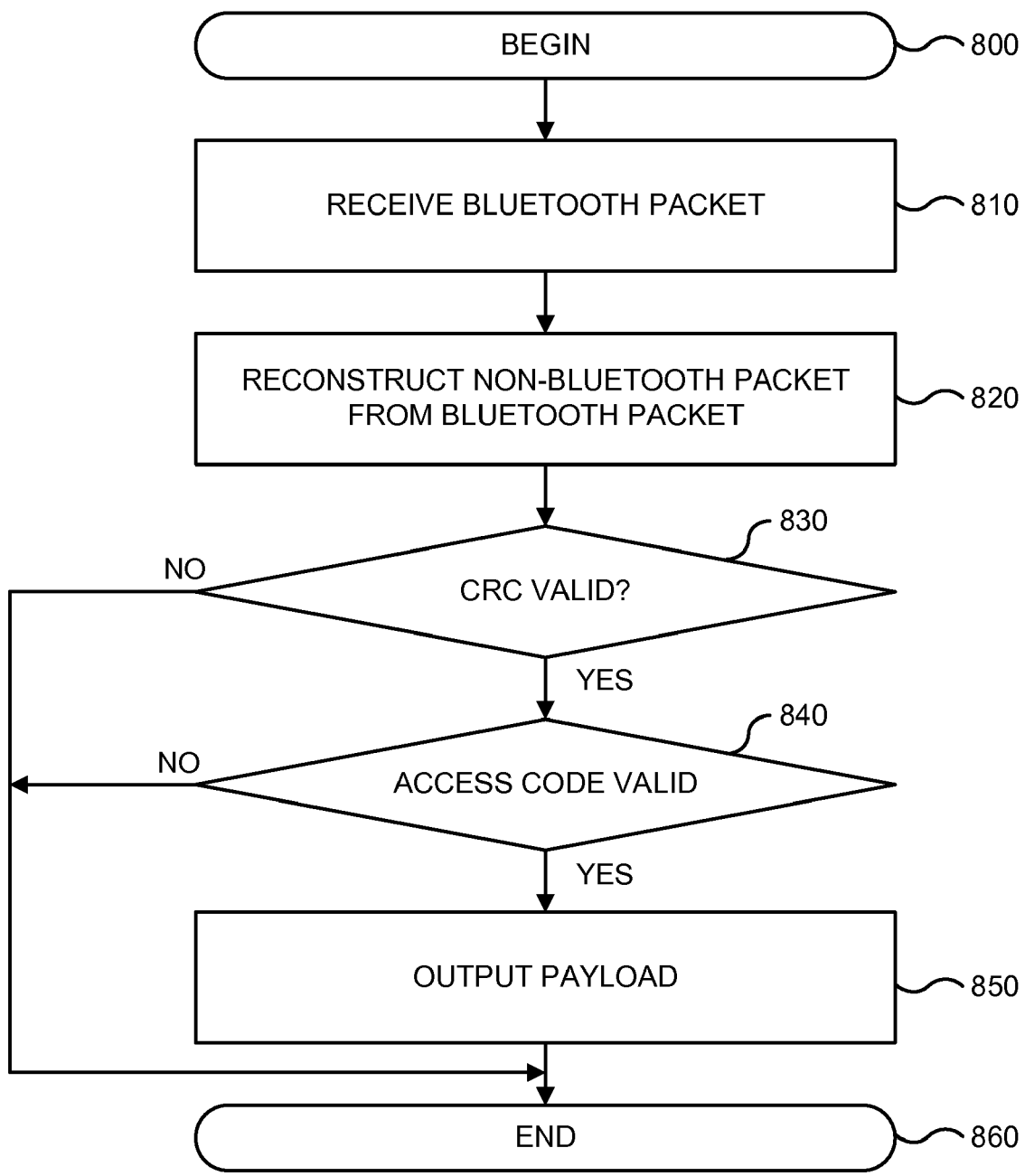
FIG. 8 is a flowchart of a method for processing non-Bluetooth packets in one embodiment according to the present invention.

FIG. 8 is a flowchart of a method for processing non-Bluetooth packets in one embodiment according to the present invention. FIG. 8 begins in step 800.

In step 810, a Bluetooth packet is received. In step 820, a non-Bluetooth packet is reconstructed from the Bluetooth packet. For example, as discussed above, transmission of a non-Bluetooth packet may be received by a Bluetooth module (e.g., over-sampled) to generate the Bluetooth packet. Hardware, software, and/or firmware elements of the Bluetooth module may apply rules, filters, and other algorithms to the Bluetooth packet to reconstruct the non-Bluetooth packet.

If the non-Bluetooth packet includes a valid cyclic redundancy check (CRC) in step 830, a determination is made in step 840 whether the non-Bluetooth packet includes a valid access code. If the non-Bluetooth packet does not include a valid CRC in step 830, or does not include a valid access code in step 840, the packet is dropped.

Alternatively, if the non-Bluetooth packet includes a valid access code, in step 850, the payload of the non-Bluetooth packet is outputted (e.g., stored, sent to an operating system, or sent to an application). FIG. 8 ends in step 860.

In various embodiments, Bluetooth module 330 of FIG. 3 may be configured to process communications that coexist in both time and frequency. In general, transmissions or signals of non-Bluetooth packets can be used to send unscheduled communications. Because transmission of a packet may occur at any time, packets may be marked with information that indicates when a next packet will arrive. This can be generally called the timing plan. Bluetooth module 330 may use timing plan to internally prioritize communications.

Figure 9:
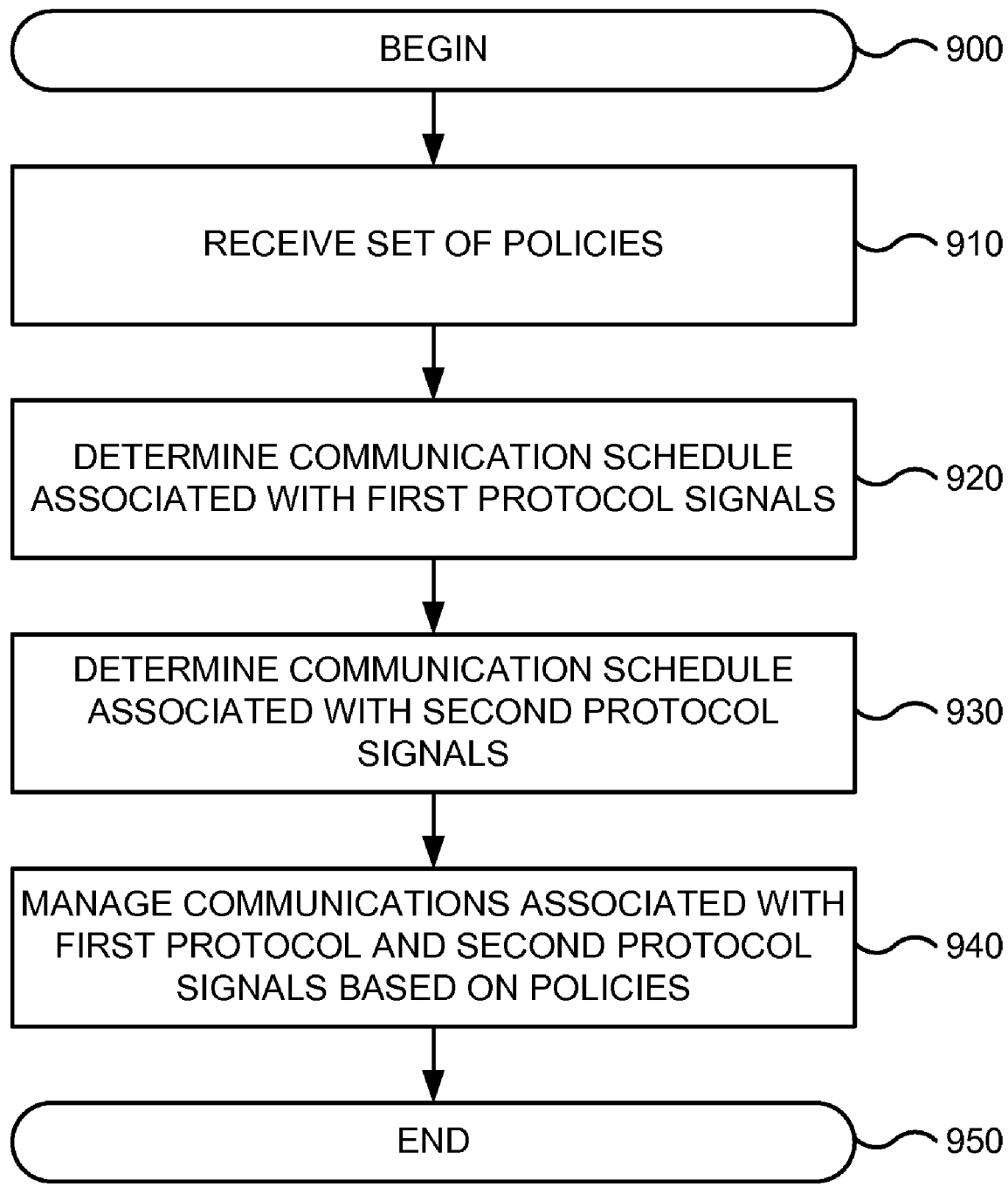
FIG. 9 is a flowchart of a method for managing communications in one embodiment according to the present invention.

FIG. 9 is a flowchart of a method for managing communications in one embodiment according to the present invention. FIG. 9 begins in step 900.

In step 910, a set of policies is received. For example, Bluetooth module 330 of FIG. 3 may receive a policy indicative of one or more criteria that need to be satisfied. The policy may also define an action to be performed when the one or more criteria are satisfied. In some embodiments, Bluetooth module 330 receives a set of policies that may prioritize voice traffic and communications over data traffic and communications. Bluetooth module 330 may receive a set of policies that prioritize communication to and from a first device (e.g., a headset) different from communication to and from a second device (e.g., a transponder or beacon).

In step 920, a communication schedule associated with first protocol signals is determined. For example, timing and frequencies used by the first protocol signals may be determined. In step 930, a communication schedule associated with second protocol signals is determined.

In step 940, communications associated with the first protocol signals and the second protocol signals are managed. In one example, if Bluetooth module 330 knows when to expect the next Bluetooth or non-Bluetooth packet from device or transponder, Bluetooth module 330 may determine a schedule that allows Bluetooth module 330 to be free (e.g., both in time and/or frequency) to listen for the next packet. Bluetooth module 330 may schedule pending transmissions at intervals other than when the expected packet is to be received or ignore the expected packet to transmit data at a higher priority.

Additionally, Bluetooth communications may be designed to operate in noisy radio frequency environments, and use a fast acknowledgement and frequency-hopping scheme to make the link robust, communication-wise. In various embodiments, Bluetooth module 330 manages communications to avoid interference from other signals by hopping to a new frequency after transmitting or receiving a packet.

Figure 10:
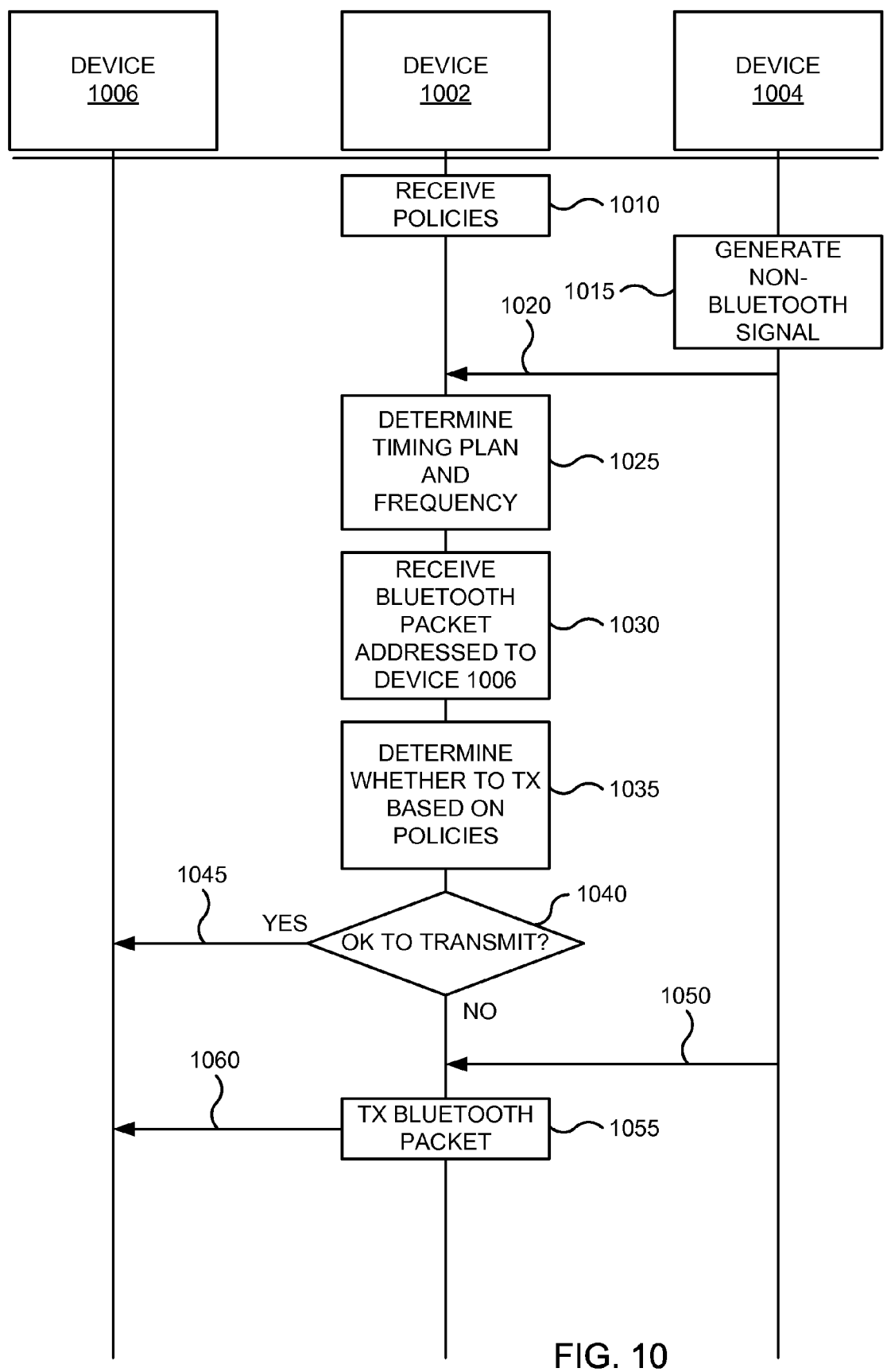
FIG. 10 is a message sequence chart illustrating communications management in one embodiment according to the present invention.

FIG. 10 is a message sequence chart illustrating communications management in one embodiment according to the present invention. In this example, device 1002 communicates with device 1004 and device 1006. Device 1002 can be any device that includes Bluetooth circuitry. For example, device 1002 may be a media player, a personal digital assistant, a smart phone, a Bluetooth dangle, or the like. Device 1004 and device 1006 can be any devices that communicate with device 1002 using one or more communications protocols, such as Bluetooth and non-Bluetooth protocols.

Referring to FIG. 10, in step 1010, device 1002 receives one or more policies. The policies may be established by the manufacturer of device 1002, a developer of hardware, software, and/or firmware elements of device 1002, a user of device 1002, or the like.

In step 1015, device 1004 generates a non-Bluetooth signal. Device 1006 transmits non-Bluetooth signal 1020, which is received by device 1002. For example, device 1002 may receive the non-Bluetooth signal with a Bluetooth Module using one or more of the method discussed above. In step 1025, device 1002 determines a timing plan and frequency associated with the non-Bluetooth signal. Device 1002 may determine when the next scheduled transmission of communications from device 1004 may occur. Device 1002 may further determine the frequency or frequencies that communications from device 1004 may use.

In step 1030, device 1002 receives a Bluetooth packet address to device 1006. For example, an application executing on device 1002 instruct device 1002 to send data to device 1006. In step 1035, device 1002 determines whether to transmit the Bluetooth packet based on the policies received in step 1010.

If device 1002 determines in step 1040 to transmit the Bluetooth packet based on the policies, Bluetooth packet 1045 is transmitted to device 1006. For example, a set of policies may indicate that voice communications are provided a higher quality of service than data communications. Therefore, if device 1006 is a wireless headset associated with device 1002, device 1002 may prioritize communications with the wireless headset over other non-voice or non-headset specific communications.

In step 1040, device 1002 may determine to not transmit the Bluetooth packet to device 1006 based on the policies. For example, device 1002 may determine that transmission of the Bluetooth packet can be delayed while device 1002 receives non-Bluetooth packet 1050 from device 1004. Device 1002 may expect non-Bluetooth packet 1050 according to the determined timing plan, and schedule other communications around the expected receive windows. In step 1055, device 1002 then transmits Bluetooth packet 1060 to device 1006 after receiving expected transmissions according to the determined timing plan.

In some embodiments, device 1002 may prioritize which frequencies may be used or reserved for communications. For example, device 1002 may reserve a particular frequency for reception of communications from device 1004. Device 1002 then may only engage in communications with device 1006 on frequencies other than the particular frequency. In various embodiments, device 1002 may communicate such a preference to device 1006 to manage communications.

Figure 11:
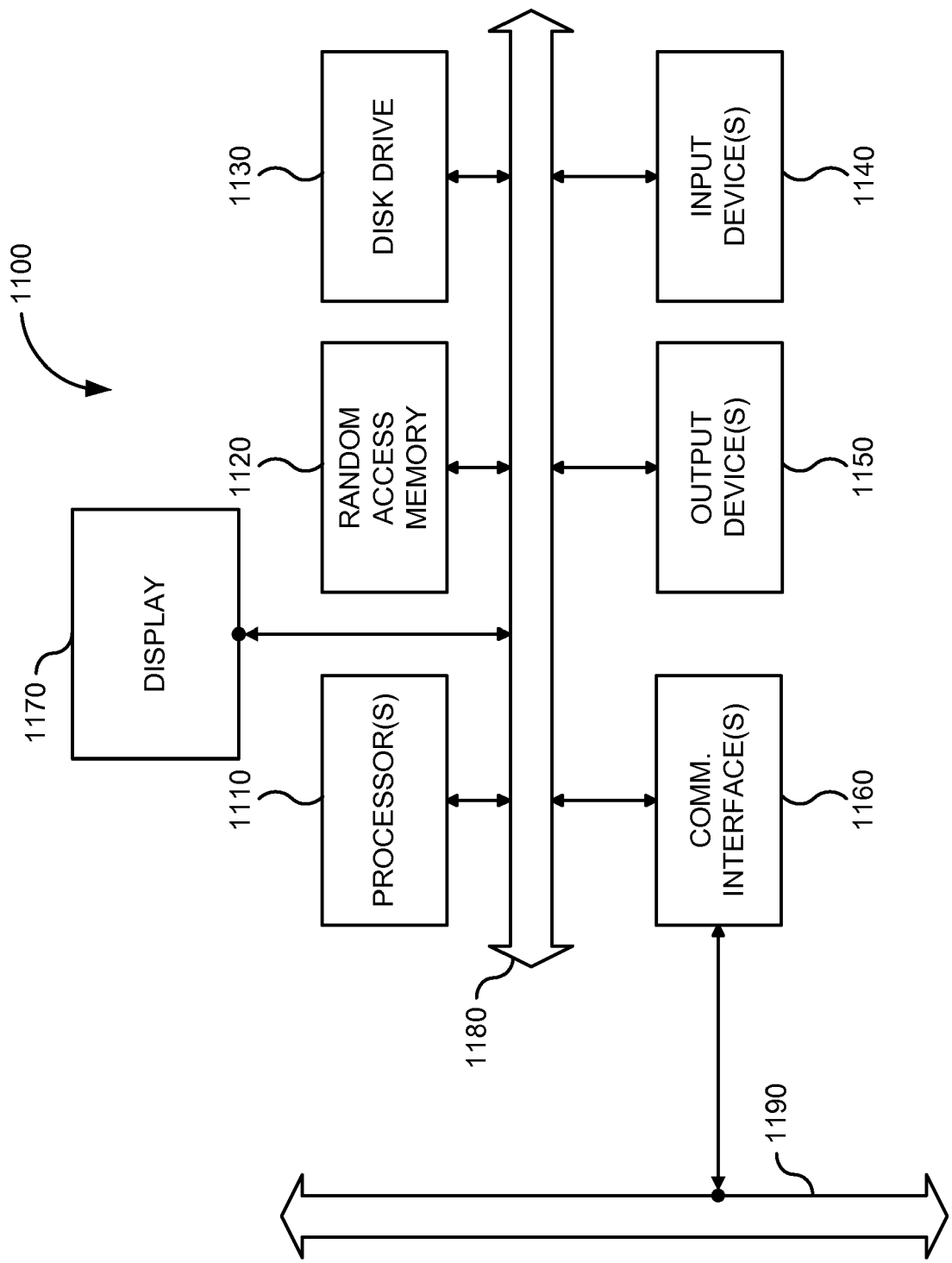
FIG. 11 is a simplified block diagram of a computer system that may incorporate embodiments of the present invention.

FIG. 11 is a simplified block diagram of a computer system 1100 that may incorporate embodiments of the present invention. FIG. 11 is merely illustrative of an embodiment incorporating the present invention and does not limit the scope of the invention as recited in the claims. One of ordinary skill in the art would recognize other variations, modifications, and alternatives.

In one embodiment, computer system 1100 includes processor(s) 1110, random access memory (RAM) 1120, disk drive 1130, input device(s) 1140, output device(s) 1150, display 1160, communications interface(s) 1170, and a system bus 1180 interconnecting the above components. Other components, such as file systems, storage disks, read only memory (ROM), cache memory, codes, and the like may be present.

RAM 1120 and disk drive 1130 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, input device 1140 is typically embodied as a computer mouse, a trackball, a track pad, a joystick, a wireless remote, a drawing tablet, a voice command system, an eye tracking system, a multi-touch interface, a scroll wheel, a click wheel, a touch screen, an FM/TV tuner, audio/video inputs, and the like. Input device 1140 may allow a user to select objects, icons, text, and the like, via a command such as a click of a button or the like. In various embodiments, output device 1150 is typically embodied as a display, a printer, a force-feedback mechanism, an audio output, a video component output, and the like. Display 1160 may include a CRT display, an LCD display, a Plasma display, and the like.

Embodiments of communications interface 1170 may include computer interfaces, such as include an Ethernet card, a modem (telephone, satellite, cable, ISDN), (asynchronous) digital subscriber line (DSL) unit, FireWire interface, USB interface, and the like. For example, these computer interfaces may be coupled to a computer network 1190, to a FireWire bus, or the like. In other embodiments, these computer interfaces may be physically integrated on the motherboard or system board of computer system 1100, and may be a software program, or the like.

In various embodiments, computer system 1100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer system 1100 may also include an operating system, such as Microsoft Windows®, Linux®, Mac OS X®, real-time operating systems (RTOSs), open source and proprietary OSs, and the like.

FIG. 11 is representative of a media player and/or computer system capable of embodying the present invention. It will be readily apparent to one of ordinary skill in the art that many other hardware and software configurations are suitable for use with the present invention. For example, the media player may be a desktop, portable, rack-mounted or tablet configuration. Additionally, the media player may be a series of networked computers. Moreover, the media player may be a mobile device, an embedded device, a personal digital assistant, a smart phone, and the like. In still other embodiments, the techniques described above may be implemented upon a chip or an auxiliary processing board.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computer-implemented method for processing a data packet, the method comprising, by the computer system:
   receiving a first data packet using a Bluetooth receiver, the Bluetooth receiver having a first data acquisition rate, wherein the first data packet is transmitted using a first data transmission rate that is different from the first data acquisition rate;
   sampling data in the first data packet at the first data acquisition rate;
   recreating the first data packet based at least in part on the sampled data;
   analyzing the recreated data packet to determine presence of a valid cyclic redundancy check (CRC) attribute and a valid access code; and
   accepting the reconstructed data packet in the event that the valid CRC attribute and the valid access code are present.

2. The method of claim 1 wherein the first data transmission rate is lower than the first data acquisition rate.

3. The method of claim 1 wherein the first data acquisition rate is a Bluetooth data rate and the first data transmission rate is about a quarter of the Bluetooth data rate.

4. The method of claim 1 wherein the first data transmission rate is one of a IEEE 802.11 (WiFi) data rate, a IEEE 802.16 (WiMAX) data rate, a Code Division Multiple Access (CDMA) data rate, or a Global System for Mobile communications (GSM) data rate.

5. A computer-implemented method for managing communications for a plurality of protocols, the method comprising, by a computer system:
   receiving a set of policies associated with the plurality of protocols, each of the policies including information about prioritizing communications for a protocol from among the plurality of protocols;
   receiving a plurality of transmissions via at least two of the plurality of protocols;
   verifying the information about prioritizing communications for each of the received transmissions based at least in part on the protocol used for the transmission; and
   scheduling data transmission and reception based at least in part on the information included in the set of policies.

6. The method of claim 5 wherein receiving a plurality of transmissions includes receiving transmissions using a Bluetooth protocol.

7. The method of claim 5 wherein verifying the information about prioritizing communications comprises determining information associated with timing and frequencies of the plurality of protocols.

8. The method of claim 5 wherein prioritizing communications includes determining information related to time intervals associated with data transmission for the first protocol and the second protocol and time intervals associated with non-transmission of data for the first protocol and the second protocol.

9. The method of claim 8 wherein scheduling data reception includes being available to receive data during the time intervals associated with transmission of data by the first protocol and the second protocol.

10. The method of claim 8 wherein scheduling data transmission includes transmitting data using the first protocol during the time intervals associated with non-transmission of data by the second protocol.

11. A device for processing data packets transmitted using a non-Bluetooth protocol comprising:
   a Bluetooth transceiver module configured to receive data transmitted using a non-Bluetooth protocol;
   a sampling module configured to sample the received data using a Bluetooth data rate to obtain sampled data;
   a packet reconstruction module configured to reconstruct the data packet based at least in part on the sampled data; and
   an analysis module configured to determine presence or absence of a valid cyclic redundancy check (CRC) attribute and a valid access code in the reconstructed packet.

12. The device of claim 11 wherein a data transmission rate of the non-Bluetooth protocol is about a quarter of the Bluetooth data rate.

13. A device for processing data packets comprising:
   means for receiving a data packet transmitted using a non-Bluetooth data rate;
   means for sampling the data packet using a Bluetooth data rate to obtain sampled data;
   means for reconstructing the data packet based at least in part on the sampled data; and means for determining presence or absence of a valid cyclic redundancy check (CRC) attribute and a valid access code in the reconstructed data packet.

14. The device of claim 13 wherein the first transmission rate corresponds to a non-Bluetooth data transmission rate.

15. The device of claim 13 wherein the first data acquisition rate is a Bluetooth data rate.

16. A device for managing communications for a plurality of protocols, the device comprising:
- a policy receiving module configured to receive a first policy associated with a first protocol and a second policy associated with a second protocol, wherein the first policy and the second policy includes communication priority information for the first protocol and the second protocol;
- analysis logic configured to determine timing and frequency information associated with the first protocol and the second protocol based at least in part on the first policy and the second policy; and
- scheduling logic configured to schedule communication for the first protocol and the second protocol based at least in part on the timing and frequency information associated with the first protocol and the second protocol.

17. A device for managing communications for a plurality of protocols, the device comprising:
- a transceiver module configured to communicate using at least a first protocol and a second protocol;
- an analysis module configured to determine time intervals of data non-transmission for the first protocol and the second protocol; and
- a scheduling module configured to schedule data transmission for the first protocol and the second protocol based at least in part on the time intervals of data non-transmission for the first protocol and the second protocol,
- wherein the scheduling module is further configured to schedule data transmission by interleaving data from the first protocol and the second protocol based at least in part on the time intervals of data non-transmission for the first protocol and the second protocol.

* * * * *